United States Patent [19]

Kono et al.

[11] Patent Number: 5,237,251
[45] Date of Patent: Aug. 17, 1993

[54] CONTROL UNIT FOR A MACHINE WITH A TAPPING FUNCTION

[75] Inventors: Shinichi Kono, Oshino; Hironobu Takahashi, Fukuoka, both of Japan

[73] Assignee: Fanuc Ltd, Minamitsuru, Japan

[21] Appl. No.: 784,408

[22] PCT Filed: Apr. 24, 1991

[86] PCT No.: PCT/JP91/00554

§ 371 Date: Feb. 4, 1992

§ 102(e) Date: Feb. 4, 1992

[87] PCT Pub. No.: WO91/16163

PCT Pub. Date: Oct. 31, 1991

[30] Foreign Application Priority Data

Apr. 26, 1990 [JP] Japan .................. 2-108622

[51] Int. Cl.⁵ ............... B22B 47/00; B23G 3/00; B23G 1/16
[52] U.S. Cl. ....................... 318/571; 318/39; 318/68; 318/569; 364/474.31; 364/474.12
[58] Field of Search ................ 318/560–636, 318/35, 68, 69; 364/474.01–474.29; 29/27 C, 26 A, 27 R; 10/129 R, 136 E, 136 SC, 136 TS; 408/9, 10, 13

[56] References Cited

U.S. PATENT DOCUMENTS

| | | | |
|---|---|---|---|
| 4,347,470 | 8/1982 | Kohzai et al. | 318/602 |
| 4,656,405 | 4/1987 | Kiya et al. | 318/571 |
| 4,692,071 | 9/1987 | Hirota | 318/39 |
| 4,912,385 | 3/1990 | Kawamura et al. | 318/571 |
| 4,985,841 | 1/1991 | Iwagaya | 364/474.31 |
| 4,992,712 | 2/1991 | Fujimoto et al. | 318/573 |
| 5,030,900 | 7/1991 | Kono et al. | 318/592 |
| 5,091,860 | 2/1992 | Fujimoto | 318/569 |
| 5,093,972 | 3/1992 | Kaku et al. | 318/68 |
| 5,132,912 | 7/1992 | Ito et al. | 318/571 |

*Primary Examiner*—Paul Ip
*Attorney, Agent, or Firm*—Staas & Halsey

[57] ABSTRACT

A control unit enables tapping onto an end surface of a workpiece while rotating the workpiece. A workpiece rotational speed command (Vc) is applied from an NC unit (90) to first and second speed control circuits (111, 121) of first and second control circuits (110, 120), to operate these control circuits in a speed control mode, so that the workpiece (70) and a tapper (80) respectively mounted on first and second main spindles (10, 20) are caused to rotate at the same speed by first and second main spindle motors (11, 21). When an error pulse amount corresponding to a workpiece rotational speed command is set in an error register (123) of the second control circuit, the second control circuit operates in a tapping mode to execute speed loop processing in accordance with a speed command calculated by position loop processing executed on the basis of a movement command, equal to the sum of the workpiece rotational speed command and a tapping speed command (Uv), and a positional feedback signal (PPC) indicative of an actual tapper rotational position, so that the tapper is rotated relative to the workpiece at a predetermined tapping speed. The tapper is axially moved toward the workpiece, whereby tapping onto the end surface of the workpiece is conducted.

6 Claims, 2 Drawing Sheets

CONTROL UNIT FOR A MACHINE WITH A TAPPING FUNCTION

BACKGROUND OF THE INVENTION

1. Field of the Invention

The present invention relates to a control unit for use with a machine having main spindles for workpiece rotation and tool rotation and provided with a tapping function, and more particularly, to a control unit for controlling the drive of main spindles so as to achieve tapping onto an end face of a rotating workpiece.

2. Description of the Related Art

In a machine of a type having main spindles respectively for workpiece rotation and for tool rotation, e.g., a compound lathe such as a turning center, a series of machining operations is implemented in succession. For instance, tapping is made onto an end face of a workpiece after cutting onto the peripheral face of the workpiece is performed, and then another cutting operation is carried out. In this case, generally, upon completion of the first cutting operation, the rotation of the workpiece is decelerated and stopped, and then the tapping is started. Further, upon completion of the tapping operation, the rotation of the workpiece is started and is then accelerated until a predetermined rotational speed suited for the second cutting operation is reached. Conventionally, therefore, it is impossible to effect machining which requires workpiece rotation simultaneously with tapping. Moreover, the workpiece rotation must be decelerated and stopped before the start of tapping, and the workpiece rotation must be restarted and accelerated after completion of tapping. As a result, a total machining time required for a series of machining operations is prolonged, leading to lower machining efficiency.

SUMMARY OF THE INVENTION

An object of the present invention is to provide a control unit capable of controlling the drive of a machine having main spindles for workpiece rotation and for tool rotation and provided with a tapping function, in a manner permitting tapping onto an end surface of a rotating workpiece.

To achieve the above-mentioned object, according to the present invention, there is provided a control unit for use with a machine, with a tapping function, which is arranged to rotatively drive a first main spindle adapted to be mounted with a workpiece by a first motor, and rotatively drive a second main spindle adapted to be mounted with a tapping tool by a second motor, and axially drive the latter spindle by a third motor.

The control unit comprises: a position detector coupled to the second main spindle; a first control circuit for controlling rotation of the first motor in accordance with a workpiece rotational speed command supplied from a host controller; a second control circuit for periodically executing position control processing in accordance with a tool rotational speed command supplied from the host controller and a positional feedback signal, indicative of an actual rotational position of the tool, supplied from the position detector to thereby periodically calculate a tool rotational speed command during the workpiece rotation, and for periodically executing speed control processing in accordance with the thus calculated speed command to thereby control rotation of the second motor; and a third control circuit for controlling rotation of the third motor in accordance with a tool axial moving speed command supplied from the host controller and corresponding to the tool rotational speed command.

According to the present invention, as described above, during the workpiece rotation effected in accordance with a workpiece rotational speed command, speed control processing is periodically executed in accordance with a tool rotational speed command during the workpiece rotation which is determined by position control processing periodically carried out in accordance with a tool rotational speed command and an actual tool rotational position, whereby the second motor for tool drive is so driven as to rotate the tool at a speed equal to a sum of a target workpiece rotational speed and a target tool rotational speed. Thus, it is possible to simultaneously rotate the workpiece and the tool with a speed difference corresponding to the tool rotational speed command. Further, during the simultaneous workpiece and tool rotation, the tool is moved axially in accordance with the tool axial moving speed command corresponding to the tool rotational speed command. This makes it possible to effect tapping onto an end surface of the workpiece with use of a tapping tool while the workpiece is rotating. Thus, tapping can be performed without stopping the workpiece rotation. Therefore, if necessary, tapping can be made simultaneously when cutting onto a peripheral surface of the workpiece is made, for instance. This makes it possible to significantly reduce a total time required for machining.

DESCRIPTION OF THE PREFERRED EMBODIMENT

Figure 1:
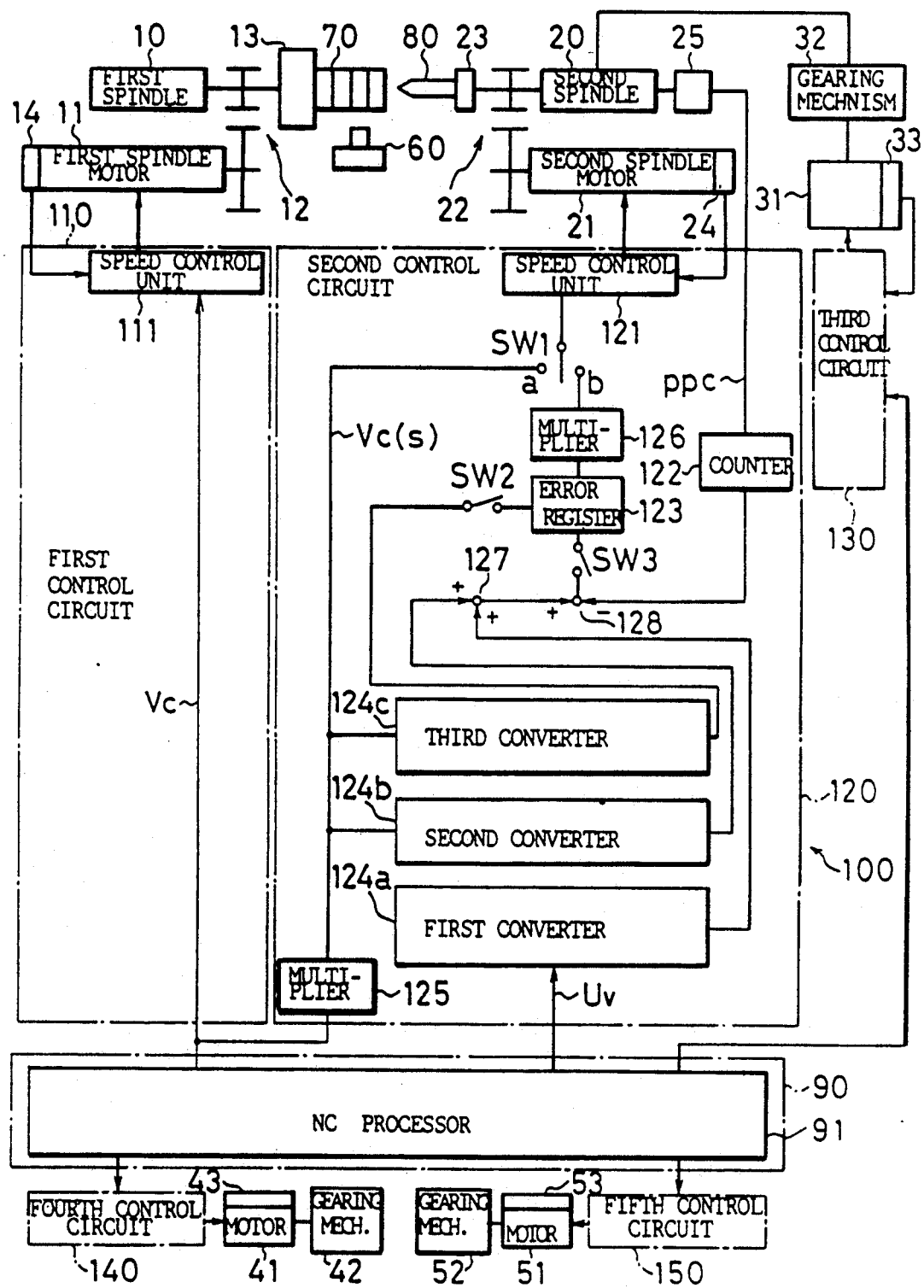
FIG. 1 is a schematic view showing a compound lathe equipped with a control unit according to an embodiment of the present invention.

Referring to FIG. 1, a compound lathe, having a function of a tapping unit, is provided with a first main spindle 10 arranged to be rotatable, a second main spindle 20 disposed in alignment with the first main spindle 10 and arranged to be rotatable and axially movable, and a tool rest 60 arranged for reciprocal motion in the axial direction of the spindles 10 and 20 and in the direction perpendicular thereto.

The first main spindle 10 is operatively coupled to a first main spindle motor 11 through a first gearing mechanism 12 consisting of, e.g., a pair of gears with a gear ratio of 1:n, so that the main spindle 10 rotates 1/n revolutions during one revolution of the motor 11. The first main spindle motor 11 is mounted with a first speed detector 14 for detecting an actual motor speed. A chuck 13 for detachably holding a workpiece 70 is mounted on one end of the first main spindle 10.

The second main spindle 20 is operatively coupled to a second main spindle motor 21 through a second gearing mechanism 22 similar to the first gearing mechanism 12 with a gear ratio of 1:m. The main spindle motor 21 is equipped with a second speed detector 24 similar to the first speed detector 14. The second main spindle 20 has at its opposite ends respectively coupled to a chuck 23 for detachably holding a tapper (tapping tool) 80 and a position coder 25. The position coder 25 is arranged to generate a feedback pulse each time the second main spindle 20 rotates a predetermined angle. Further, the second main spindle 20 is connected to a third motor 31 through a third gearing mechanism 32, so that the second main spindle 20 reciprocates axially as the third motor 31 rotates in the forward and reverse directions. Reference numeral 33 indicates a position detector.

A tool rest 60 is coupled to fourth and fifth motors 41 and 51 through fourth and fifth gearing mechanisms 42 and 52, respectively, so that the tool rest 60 reciprocates in the axial direction of the first and second main spindles 10 and 20 and in the direction perpendicular thereto as the motors 41 and 51 rotate in the forward and reverse directions. Reference numerals 43 and 53 indicate position detectors.

The compound lathe is equipped with a control unit 100 of an embodiment of the present invention. The control unit 100 is operable in either one of operating modes under the control of a host controller such as a numerical control unit 90 which has a processor (hereinafter referred to as NC processor) 91. The operating modes of the control unit 100 include a speed control mode for separately and independently controlling the rotational speeds of the first and second main spindles 10 and 20, and a tapping mode for performing a tapping operation while correlatively controlling the rotational speeds of these main spindles. In the speed control mode, only the first main spindle 10 or both of the first and second main spindles 10 and 20 can be rotated. The control unit 100 is equipped with first to fifth control circuits, 110, 120, 130, 140, and 150 accommodating therein microprocessors (hereinafter referred to as first to fifth processors), not shown, for controlling the first and second main spindle motors 11 and 21, and the third, fourth, and fifth motors 31, 41, and 51.

Functionally, the first control circuit 110 includes a speed control circuit 111 connected to the NC processor 91 and the first speed detector 14. Namely, the first processor of the first control circuit 110 is arranged to perform speed loop control for the first main spindle motor 11 in accordance with a workpiece rotational speed command Vc periodically supplied from the NC processor 91 at intervals of a predetermined pulse distribution cycle ITP and a speed feedback signal supplied from the first speed detector 14 and indicative of an actual workpiece rotational speed, to thereby cause the first main spindle 10 to rotate at a rotational speed Vc/n.

Functionally, the second control circuit 120 is provided with a speed control circuit 121, a position counter 122, an error register 123, first to third converter sections 124a–124c, first and second multipliers 125 and 126, an adder 127, a subtracter 128, and first to third switches SW1–SW3. Namely, the second processor of the second control circuit 120 is designed to achieve functions of corresponding ones of the elements 121–128, and SW1–SW3. The position counter 122, the error register 123, the second multiplier 126, etc. constitute a position control circuit.

More specifically, the first multiplier 125 is arranged to multiply a ratio m/n of the gear ratio of the first gearing mechanism 12 to the gear ratio of the second gearing mechanism 22 by the workpiece rotational speed command Vc supplied from the NC unit 90, to thereby periodically generate a tapper rotational speed command Vc(s) for rotating the tapper 80 at the same speed as the workpiece rotational speed at intervals of the same cycle as the pulse distribution cycle ITP. An output terminal of the first multiplier 125 is connected to a first stationary contact a of the first switch SW1, and to input terminals of second and third converter sections 124b and 124c.

The second and third converter sections 124b and 124c are designed to convert the output Vc(s) of the first multiplier 125 into a corresponding moving command and into a corresponding error pulse amount (positional deviation amount), respectively. Output terminals of these converter sections are respectively connected to a first input terminal of the adder 127 and an input side of the second switch SW2. An error pulse amount calculated by the third converter section 124c is equal to a value (Vc(s)/(ITP×PG)) obtained by dividing the output Vc(s) of the first multiplier 125 by the product of the pulse distribution cycle ITP and the multiplying factor (positional loop gain) of the second multiplier 126. The first converter section 124a is designed to convert a tapping speed command Uv, periodically delivered from the NC unit 90 at intervals of the same cycle as the pulse distribution cycle ITP, into a tapping moving command. An output terminal of the first converter section is connected to a second input terminal of the adder 127.

The position counter 122 is arranged to count a positional feedback pulse signal PPC supplied from the position coder 25 and indicative of an actual rotational position of the second main spindle 20, to thereby calculate an amount of change in a count value produced between adjacent pulse distributing cycles, the amount of change indicating an actual movement of the second main spindle 20 in one pulse distribution cycle ITP. An output terminal of the position counter 122 is connected to a negative input terminal of the subtracter 128. The subtracter 128 has a positive input terminal connected to an output terminal of the adder 127, and an output terminal connected to a first input terminal of the error register 123 through the third switch SW3. A second input terminal of the error register 123 is connected to the third converter section 124c via the second switch SW2, and the output terminal of the error register 123 is connected to the speed control circuit 121 via the second multiplier 126 and the first switch SW1.

In the following, the operation of the compound lathe of FIG. 1 will be explained.

In normal machining, e.g., machining of a peripheral surface of a workpiece, the first and second control circuits 110 and 120 operate in the speed control mode. Namely, the speed control circuit 111 of the first control circuit carries out speed loop control in accordance with the workpiece rotational speed command Vc supplied from the NC unit 90 and the speed feedback signal supplied from the first speed detector 14, to thereby rotate the first main spindle motor 11 at the speed Vc, so that the first main spindle 10 and the workpiece 70 rotate at the speed Vc/n. At the same time, the fourth and fifth motors 41 and 51 are driven by the fourth and fifth control circuits 140 and 150, so that the tool rest 60 and a machining tool (not shown) mounted thereon move in the direction parallel to the workpiece axis and in the direction perpendicular thereto, whereby the peripheral surface of the workpiece is machined.

During the machining operation, a movable contact of the first switch SW1 is changed to its neutral position, so that the speed control circuit 121 is isolated from other elements of the second control circuit 120.

As a result, no substantial speed loop processing is conducted by the speed control circuit 121 of the second control circuit 120, and hence the second main spindle motor 21 and the second main spindle 20 are kept stopped. Similarly, the third control circuit 130 is rendered to be inoperative, whereby the axial movement of the second main spindle 20 is prevented.

In case that a tapping process is carried out subsequently to or simultaneously with an ordinary machining process, the tapping process is implemented without stopping the workpiece rotation. In this case, when a program sentence commanding a preparatory job prior to start of the tapping process is read from a machining program, an automatic tool exchanger (not shown) and the third control circuit 130 are operated under the control of the NC unit 90. More specifically, a drill (not shown) is mounted on the chuck 23 of the second main spindle 20 by the tool exchanger, then the third motor 31 is driven by the third control circuit 130 so that the drill mounted on the second main spindle 20 axially moves toward the workpiece 70, whereby a starting hole for tapping is formed in an end surface of the workpiece 70. Next, the drill mounted on the chuck 23 is replaced by the tapper 80 by the tool exchanger. Further, the movable contact of the first switch SW1 of the second control circuit 120 is switched to the first stationary contact a.

As a result, the tapper rotational speed command Vc(s), which is equal to the product Vc·m/n of the workpiece rotational speed command Vc and a ratio m/n, is applied to the speed control circuit 121 from the first multiplier 125 via the first switch SW1. The speed control circuit 112 carries out the speed loop processing on the basis of the tapper rotational speed command Vc(s) and the speed feedback signal supplied from the second speed detector 24, to cause the second main spindle motor 21 to rotate at the speed Vc(s). As a result, the tapper 80 installed on the second main spindle 20 is caused to rotate at the same speed as the workpiece rotational speed Vc/n.

Thereafter, when a rigid tapping command is read from the machining program, the first and second control circuits 110 and 120 operate in the tapping mode. At this time, the first control circuit 110 operates in the same manner as in the speed control mode, and the workpiece 70 continues to rotate at the speed Vc/n. In the second control circuit 120, the first switch SW1 is switched to the second stationary contact b side, the third switch SW3 is closed, and the second switch SW2 is closed temporarily. As a result, the position loop control and the speed loop control are carried out in the second control circuit 120.

More specifically, when the second switch SW2 is closed, an error pulse amount (Vc(s)/(ITP×PG)) supplied from the third converter section 124c and corresponding to the first multiplier output Vc(s) is set in the error register 123. In the adder 127, a tapping movement command, supplied from first converter section 124a and corresponding to, e.g., a positive tapping speed command Uv, and a movement command, supplied from the second converter section 124b and corresponding to the first multiplier output Vc(s), are added together. An output data, supplied from the position counter 122 and indicative of an actual movement of the second main spindle 20 per one pulse distribution cycle, is subtracted from the added value in the subtracter 128, and the subtracted result is added via the third switch SW3 to a stored value of the error register 123. Further, in the second multiplier 126, an output of the error register 123 is multiplied by the position gain PG. The output of the second multiplier 126 indicative of the multiplied result, which is calculated as described above in the position control circuit of the second control circuit 120, is substantially equal to the sum of the workpiece rotational speed command Vc and the tapper rotational speed command Vc(s). The output of the second multiplier is applied, as a tapper rotational speed command during the workpiece rotation, to the speed control circuit 121 via the first switch SW1.

The speed control circuit 121 performs the speed loop processing in accordance with the tapper rotational speed command (Vc(s)+Uv) during the workpiece rotation and the speed feedback signal from the second speed detector 24, thus rotating the second main spindle motor 21 at the speed (Vc(s)+Uv). As a result, the tapper 80 mounted on the second main spindle 20 rotates at a speed which is different from the workpiece rotational speed Vc/n by a predetermined tapper rotational speed Uv/m, e.g., at a speed which is faster than the workpiece rotational speed by the speed Uv/m. In other words, the tapper 80 rotates at a predetermined tapper rotational speed relative to the workpiece 70.

While the tapper 80 is rotating, e.g., a positive tapper axial moving speed command Uz, which is determined by the tapping speed command Uv and a tapping pitch (pitch of a thread to be machined), is supplied from the NC unit 90 to the third control circuit 130, so that the tapper 80 axially moves at a speed corresponding to the speed command Uz toward the workpiece 70 via the third motor 31, whereby accurate rigid tapping onto an end surface of the workpiece 70 is performed.

Thereafter, when the tapping to a predetermined depth is completed, the tapping speed command Uv of a value "0" is delivered to the second control circuit 120, and the tapper axial moving speed command Uz of a value "0" is delivered to the third control circuit 130. In response to "0" tapping speed command Uv, the second control circuit 120 operates in the same manner as it does during the tapping process mentioned above. This causes the tapper 80 to rotate at the same speed as the workpiece rotational speed. Further, the axial movement of the tapper 80 is stopped under the control of the third control circuit 130.

Then, e.g., a negative tapping speed command Uv, which is the same in magnitude as and opposite in sign from, e.g., a positive tapping speed command Uv delivered during the aforementioned tapping process, is delivered from the NC unit 90 to the second control circuit 120. At the same time, e.g., a negative tapper axial moving speed command Uz, which is the same in magnitude as and opposite in sign from a positive tapper axial moving speed command Uz delivered during the tapping process, is delivered from the NC unit 90 to the third control circuit 130. In this case, the second and third control circuits 120 and 130 operate in the same manner as in the tapping process. As a result, the second main spindle motor 21 rotates at a speed (Vc(s)−Uv), and the tapper 80 rotates in the direction opposite from the rotational direction in the tapping at a speed which is different from the workpiece rotational speed by a predetermined tapper rotational speed, e.g., at a speed which is slower than the workpiece rotational speed by the predetermined tapper rotational speed. At the same time, the tapper 80 moves in the direction away from the workpiece 70 at a speed corresponding to the tapper axial moving speed command Uz. Thus, the tapper 80 is brought to be removed from the tapped hole (not shown) formed in the workpiece 70 by the tapping.

Thereafter, when the tapper 80 is moved back to a predetermined return position, the drive of the second main spindle motor 21 and the third motor 31 is stopped, so that the rotation and backward movement of the tapper 80 are stopped.

As discussed above, the second control circuit 120 is mainly comprised of the second processor. Thus, the position loop control and the speed loop control, already explained with reference to FIG. 1 functionally showing the control unit 100, are implemented in the following manner by means of software processing executed by the second processor.

Figure 2:
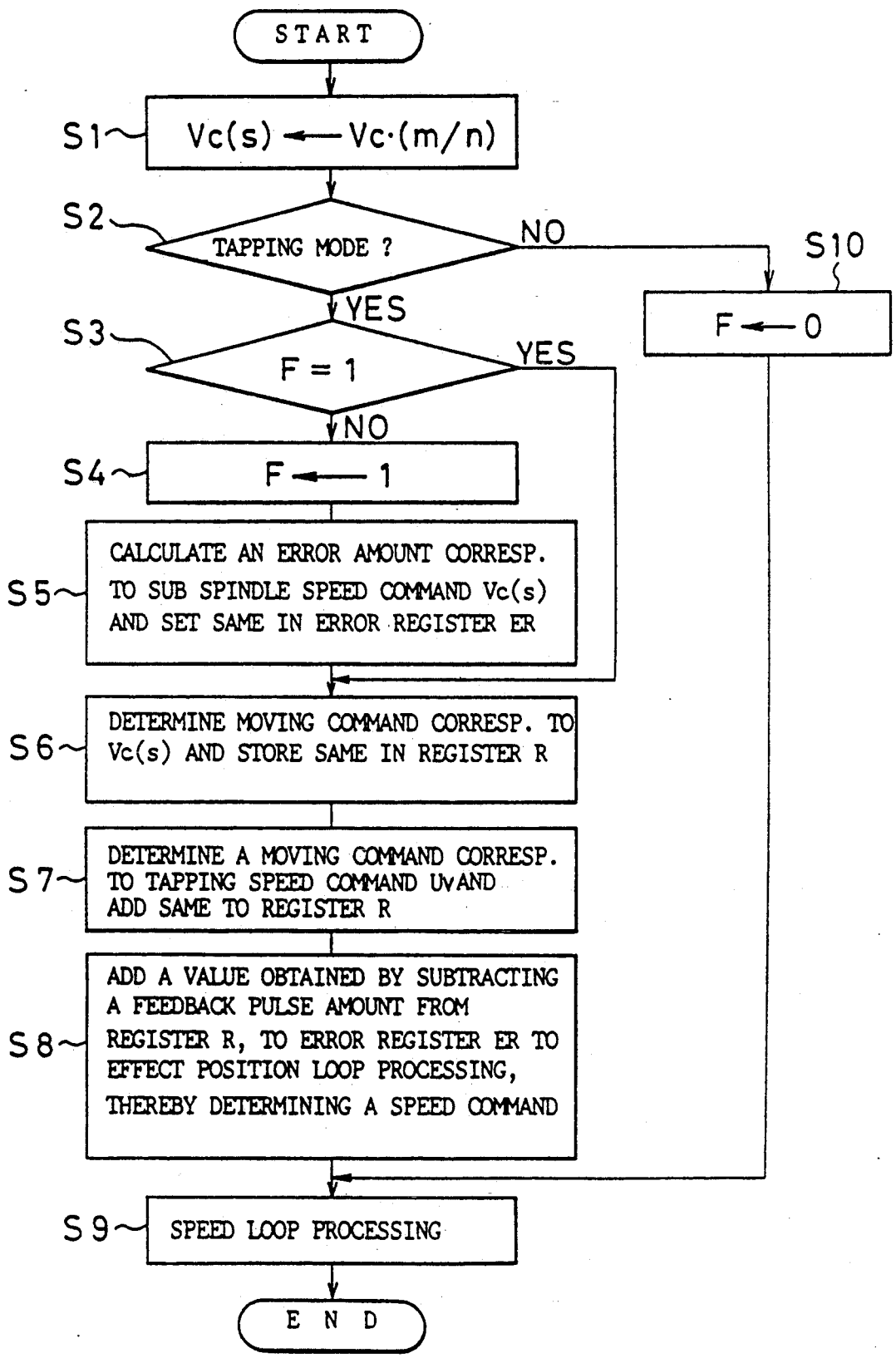
FIG. 2 is a flowchart showing position control loop processing and speed control loop processing associated with a second main spindle, which are executed by the processor of the second control circuit shown in FIG. 1.

The second processor repeatedly carries out the processing shown in FIG. 2 at intervals of the same cycle as the pulse distribution cycle ITP. In each cycle, the second processor multiplies the workpiece rotational speed command Vc sent from the NC unit 90 by a ratio m/n, to thereby calculate the tapper rotational speed command Vc(s) during the workpiece rotation (step S1). Then, the second processor determines whether or not the rigid tapping command has been delivered from the NC unit 90, to thereby determine whether the tapping mode is selected or not (step S2). If the tapping mode is not selected, then the second processor resets a flag F to a value "0" (step S10), and executes the speed loop processing (step S9). As a result, the tapper 80 rotates at the same speed as the workpiece rotational speed.

If it is determined at the step S2 in a later cycle that the tapping mode is selected, then the second processor determines whether the flag F has been set to a value "1" or not (step S3). If the value of the flag F is not "1", flag F is set to the value "1" (step S4). Next, the second processor calculates an error pulse amount, corresponding to the tapper rotational speed command Vc(s) during the workpiece rotation which was calculated in the step S1, and stores the calculation result in an error register ER (which corresponds to the error register 123 shown in FIG. 1) (step S5). The processor calculates a movement command value corresponding to the speed command Vc(s), and stores the calculation result in the register R (step S6). Further, the second processor calculates a movement command value corresponding to the tapping speed command Uv supplied from the NC unit 90, and adds the calculated value to the stored value in the register R (step S7). Then, the second processor reads a position feedback pulse amount in a corresponding one ITP cycle from the position counter 122, and subtracts the pulse amount from the stored value in the register R. The processor adds a stored value in the register R after the subtraction to the stored value in the error register ER, and multiplies the resultant value by the position loop gain PG, to thereby determine the speed command value (step S8). Next, the processor executes speed loop processing in accordance with the speed command value determined by the position loop processing which consists of the aforementioned steps S5 to S8 (step S9). In the subsequent cycles, the steps S1 to S3, and S6 to S9 are repeatedly executed.

As a result, as is already explained with reference to FIG. 1, the tapper 80 installed on the second main spindle 20 rotates relative to the workpiece 70 mounted on the first main spindle 10 at a speed corresponding to the tapping speed command Uv. During the tapper rotation, the tapper 80 is axially moved toward the workpiece 70 as mentioned above, so that tapping is carried out, whereby a tapped hole is formed in the workpiece 70.

Upon completion of the tapping process, as is already explained with reference to FIG. 1, the tapping speed command and the tapper axial moving speed command are set to the value "0, so that the tapper 80 is rotated at the same speed as the workpiece rotational speed, and the axial movement of the tapper 80 is stopped. Thereafter, the tapping speed command and the tapper axial moving speed command which are the same in magnitude as and opposite in sign from those during the tapping process are delivered, so that the tapper 80 is removed from the tapped hole in the workpiece 70. When the end of the tapping mode is determined at the step S2 of a cycle immediately after the completion of the tapping mode, the flag F is reset to the value "0."

What is claimed is:

1. A control unit for use with a machine with a tapping function which responds to a host controller by rotatively driving a first main spindle adapted to be mounted with a workpiece by a first motor, rotatively driving a second main spindle adapted to be mounted with a tapping tool by a second motor, and axially driving the second main spindle by a third motor, said control unit comprising:
   a position detector coupled to the second main spindle for producing a positional feedback signal indicative of an actual rotational position of the second main spindle;
   a first control circuit for controlling rotation of the first motor in accordance with a workpiece rotational speed command supplied from the host controller;
   a second control circuit for periodically executing position control processing in accordance with the workpiece rotational speed command and a tool rotational speed command supplied from the host controller and the positional feedback signal supplied from said position detector to periodically calculate a second spindle rotational speed command during workpiece rotation, and for periodically executing speed control processing in accordance with the second spindle rotational speed command to control rotation of the second motor; and
   a third control circuit for controlling rotation of the third motor in accordance with a tool axial moving speed command supplied from the host controller and corresponding to the tool rotational speed command.

2. The control unit according to claim 1, wherein said second control circuit further includes selection means for selecting one of a tapping mode where the speed control processing is executed in accordance with the tool rotational speed command during the workpiece rotation calculated in the position control processing and a speed control mode where the speed control processing is executed in accordance with the workpiece rotational speed command, and the tapping mode is entered after the second main spindle is brought to rotate at the rotational speed of the first main spindle by execution of the speed control mode.

3. The control unit according to claim 2,
   further comprising first and second speed detectors coupled to the first and second main spindles for supplying first and second speed feedback signals, respectively;

wherein said first control circuit is operable to control rotation of the first motor in accordance with the workpiece rotational speed command and the first speed feedback signal, indicative of an actual workpiece rotational speed, supplied from said first speed detector; and wherein said second control circuit is operable to control rotation of the second motor in accordance with one of the workpiece rotational speed command and the tool rotational speed command during the workpiece rotation calculated by the position control processing, and the second speed feedback signal, indicative of an actual tool rotational speed, supplied from said second speed detector.

4. A method of controlling a machine with a tapping function, having a first spindle adapted to be mounted with a workpiece and rotatively driven by a first motor about a rotational axis, and a second spindle adapted to be mounted with a tapping tool, rotatively driven by a second motor around the rotational axis and driven by a third motor along the rotational axis, said method comprising the steps of:

(a) producing a positional feedback signal indicative of an actual rotational position of the second spindle;

(b) controlling rotation of the first motor in accordance with a workpiece rotational speed command;

(c) periodically executing position control of the second spindle in a tapping control mode in accordance with the positional feedback signal, the workpiece rotational speed command and a tool rotational speed command indicating speed of the tapping tool relative to the workpiece, to periodically obtain a second spindle rotational speed command during workpiece rotation;

(d) periodically executing speed control processing to control rotation of the second motor in accordance with the second spindle rotational speed command; and (e) controlling the third motor to produce movement of the second spindle along the rotational axis in accordance with a tool axial moving speed command and corresponding to the tool rotational speed command.

5. A method according to claim 4, further comprising the steps of:

(f) periodically executing speed control of the first and second spindles independently in a speed control mode;

(g) periodically executing speed control of the first and second spindles to produce rotation of the first and second spindles at substantially identical speeds prior to entering the tapping control mode; and (h) selecting between the speed and tapping control modes.

6. A method according to claim 5, wherein said executing in steps (d), (f) and (g) includes controlling the first motor in accordance with the workpiece rotational speed command and a first speed feedback signal, indicative of an actual workpiece rotational speed, supplied from a speed detector coupled to the first spindle, and wherein said executing in step (d) includes controlling the second motor in accordance with the workpiece and tool rotational speed commands and a second speed feedback signal, indicative of an actual tool rotational speed, supplied from a second speed detector coupled to the second spindle.

* * * * *